United States Patent Office 3,567,746
Patented Mar. 2, 1971

3,567,746
N-ARYL BENZAMIDES
Bola Vithal Shetty, Rochester, N.Y., assignor to
Pennwalt Corporation
No Drawing. Filed July 10, 1968, Ser. No. 743,615
Int. Cl. C07c 143/80
U.S. Cl. 260—397.7
19 Claims

ABSTRACT OF THE DISCLOSURE

Compounds useful in preparing quinazolinone compounds having superior diuretic properties have the following generic formula:

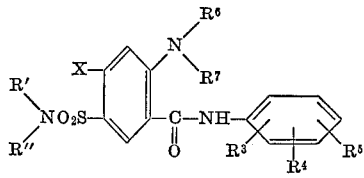

or the pharmaceutically acceptable salts thereof, wherein X is halogen or trifluoromethyl; R' and R" are hydrogen, lower alkyl, phenylloweralkyl or phenyl; $R^6$ and $R^7$ are hydrogen, lower alkyl, phenyl, phenyl lower alkyl, amino lower alkyl, lower alkyl amino lower alkyl, lower alkanoyl or hydroxy lower alkyl, and $R^3$, $R^4$ and $R^5$ are hydrogen, lower alkyl, hydroxy, lower alkoxy, amino, lower alkoxy lower alkyl, halogen, sulfamyl or trifluoromethyl.

The above compounds are made, for example, by reacting 4-chloro-5-sulfamyl anthranilic acid with liquid phosgene in glacial acetic acid and the product dried over $P_2O_5$ to produce 7-chloro-6-sulfamylisatoic anhydride. This compound was then reacted with o-toluidine, p-chloroaniline, or other substituted aniline to give the amide of this invention.

The invention relates to substituted anthranilamide derivatives that are useful in the preparation of 1,2,3,4-tetrahydro - 7-halo or 7 - trifluoromethyl - 6-sulfamyl-4-quinazolinones having a phenyl or substituted phenyl group in the 3-position. The invention includes the process of making such compounds.

In U.S. Pat. No. 3,360,518, issued Dec. 26, 1967 to Bola Vithal Shetty there are disclosed 1,2,3,4-tetrahydro-7-halo - 6-sulfamyl - 4-quinazolinones in which there may be a benzyl group or a phenyl group in the 3-position, such compounds being made by reduction of the corresponding unsaturated quinazolinone compound. These compounds are diuretic agents. However, the tetrahydro quinazolinone compounds in which a phenyl or a substituted phenyl is in the 3-position are far superior diuretic agents than the tetrahydro-quinazolinone compounds having an aralkyl group such as a benzyl in the 3-position.

U.S. Pat. No. 2,910,488, issued Oct. 27, 1959 to Frederick C. Novello shows substituted anthranilamide compounds having a dialkyl amide in the 3-position but such compounds are made by a different process than applicant's N-aryl-benzamides, and give quinazolinone compounds which are far inferior in diuretic properties to the quinazolinone compounds made from applicant's compounds.

Likewise the unsaturated quinazolinone compounds made from the anthraanilamides of U.S. Pat. 3,014,906, and even the undisclosed saturated quinazolinone compounds are inferior to the saturated quinazolinone compounds made from applicant's compounds.

The new compounds of the present invention can be illustrated by the following general formula:

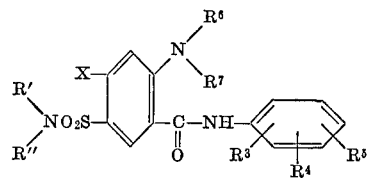

or the pharmaceutically acceptable salts thereof, wherein X is halogen or trifluoromethyl; R' and R" are hydrogen, lower alkyl or phenyl; $R^6$ and $R^7$ are hyrogen, lower alkyl, phenyl, phenyl lower alkyl, amino lower alkyl, lower alkyl amino lower alkyl, lower alkanoyl or hydroxy lower alkyl, and $R^3$, $R^4$ and $R^5$ are hydrogen, lower alkyl, hydroxy, lower alkoxy, amino, lower alkoxy lower alkyl, halogen, sulfamyl or trifluoromethyl.

The above compounds are made, for example, by reacting 4-chloro-5-sulfamyl anthranilic acid with liquid phosgene in glacial acetic acid and the product dried over $P_2O_5$ to produce 7-chloro - 6-sulfamylisatoic anhydride. This compound was then reacted with o-toluidine, p-chloroaniline, or other substituted aniline to give the amide of this invention.

The compounds of this invention are diuretic agents themselves but are of little value compared to the quinazoline compounds which are made from them. However, therapeutic effective salts of the compounds can be made by methods known to the art, are useful diuretics, but generally would not be used as intermediates in making quinazolinones. For example, the sulfamyl group react with bases to give sodium, potassium or ammonium salts of the anthranilamide compound. The basic nitrogen of the anthranilamide can be reacted with acids such as hydrochloric, maleic, tartaric, and the acidic ion exchange resins such as carboxylic acid, phosphonic acid, and sulfonic acid cation exchange resins to give the therapeuticaly effective and nontoxic salts of the anthranilamide compound.

The following examples illustrate the preparation of compounds of this invention.

EXAMPLE 1

Preparation of 2-amino-4-chloro-5-sulfamyl-N-(o-tolyl)-benzamide

Synthetic Route:

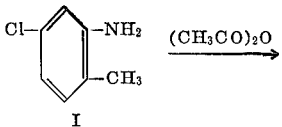

I

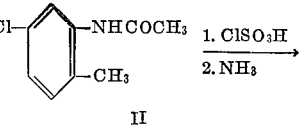

II

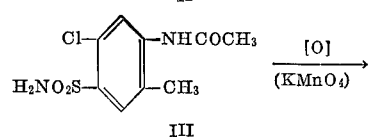

III

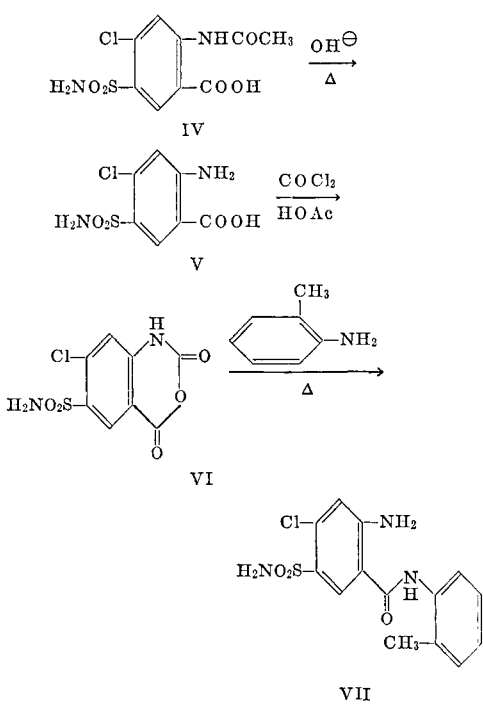

5-chloro-2-methylacetanilide (II)

5-chloro-o-toluidine (I) (1000 gm.) was added to 9000 ml. of water, preheated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

5-chloro-2-methyl-4-sulfamylacetanilide (III)

Chlorosulfonic acid (1000 gm.) was placed in nitrogen flushed 5 liter, 3 neck round bottom flask fitted with a stirrer and a calcium chloride tube. 5-chloro-2-methylacetanilide (300 gm.) was cautiously added to the chlorosulfonic acid and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

N-acetyl-4-chloro-5-sulfamyl anthranilic acid (IV)

Into a 12 liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved (under Lot #745–687) in 100 liters of 95% ethanol. The resulting solution was concentrated to a total volume of 10 liters, periodically filtering off the product that had crystallized out and washing this with 95% ethanol. The yield of purified product was 2500 gm. melting at 264–266°, from 3 kg. of starting material.

4-chloro-5-sulfamylanthranilic acid (V)

N-acetyl-4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

7-chloro-6-sulfamylisatoic anhydride (VI)

4-chloro-5-sulfamylanthranilic acid (664 gm.) was slurried in 8000 ml. glacial acetic acid and 800 gm. liquid phosgene was added with good stirring. It was stirred vigorously for three hours at room temperature, filtered and washed with 1000 ml. acetic acid and 2000 ml. anhydrous ether. After drying in vacuo over phosphorous pentoxide, it weighed 698 gm. and melted at 290–292°. This material was combined with the lots obtained in runs 746–742, and 747–570. The total weight of product was 2214 gm. from 2000 gm. of starting material.

2-amino-4-chloro-5-sulfamyl-N-(o-tolyl)-benzamide (VII)

7-chloro-6-sulfamylisatoic anhydride (720 gm.) was added to a 12 liter nitrogen flushed flask containing 4200 ml. o-toluidine and the mixture was stirred for ½ hour. It was then heated to 178° (solution occurred at ~177°) and kept at about 175° for 10 minutes. It was allowed to cool to 60° by removing the heating mantle, then cooled rapidly to 25° with an ice bath. Ether (4200 ml.) was added, the mixture was stirred for a few minutes, filtered and washed thoroughly with ether. The crude product was slurried with 9000 ml. of isopropanol, filtered, washed twice with 2000 ml. isopropanol, twice with 2500 ml. 8% aqueous ammonia, once with 2000 ml. water, twice with 1000 ml. isopropanol and finally three times with 2000 ml. ether. After air drying, the product weighed 560 gm. and melted at 287–289°. This partially purified amide was combined with the product obtained in runs 743–870 and 747–574 and the total (1573 gm.) was recrystallized (under Lot #743–871). The amide was dissolved in 3000 ml. dimethylformamide, filtered with celite and heated to 90°. To the resulting solution was added all at once, 1800 ml. 95° water. The suspension that resulted was allowed to cool with stirring over 20 hours, then filtered and washed with 1000 ml. 2:1 dimethylformamide:water, 2000 ml. methanol and 1500 ml. ether. After drying the product weighed 1458 gm. and melted at 289–292° with decomposition.

EXAMPLE 2

Preparation of 2-acetamido-4-chloro-5-sulfamyl-N-(o-tolyl)-benzamide 2-amino-4-chloro-5-sulfamyl-N-(o-tolyl)-benzamide (17 gm.) was refluxed with 150 gm. acetic anhydride.

After 15 minutes the reaction mixture was added to water and the solid filtered and recrystallized from ethanol to give 7.3 gm., M.P. 238–9°.

EXAMPLE 3

Preparation of 2-amino-4-chloro-5-sulfamyl-N-phenylbenzamide 7-chloro-6-sulfamylisatoic anhydride (51 gm.) and 300 ml. aniline were heated to 175°, kept at 175° for 5 minutes and cooled to room temperature. Ether (300 ml.) was added and the solid filtered and washed. The product was recrystallized from a mixture of 75 ml. dimethylformamide and 60 ml. water to give 33.5 gm., M.P. 227–30°. A second crop of 5.7 gm. was obtained from the filtrate by adding 100 ml. water, heating to solution and cooling.

EXAMPLE 4

Preparation of 2-amino-4-chloro-5-sulfamyl-N-(p-tolyl)-benzamide 7-chloro-6-sulfamylisatoic anhydride (17 gm.) and 100 gm. p-toluidine were heated to 175°, held 5 minutes at 175° and cooled. Ether (100 ml.) was added and the solid filtered and washed with ether. The solid was dissolved in 35 ml. dimethylformamide, 29 ml. water added and the mixture heated to 100° and then cooled. The product was filtered, washed with 50% aqueous dimethylformamide, then with alcohol to give 15.8 gm., M.P. 260.5–3.5°.

EXAMPLE 5

Preparation of 2-amino-4-chloro-5-sulfamyl-N-(m-tolyl)benzamide 7-chloro-6-sulfamylisatoic anhydride (20 gm.) and 120 ml. m-toluidine were heated to 165°, kept at 165° for 3 minutes and cooled. Ether was added and the solid filtered and washed with alcohol, ether, and methanol to give 19.1 gm., M.P. 274–7°.

EXAMPLE 6

Preparation of 2-amino-4-chloro-5-sulfamyl-N-(p-chlorophenyl)-benzamide 4-chloro-5-sulfamylisatoic anhydride (10 gm.), 10 gm. p-chloroaniline, and 50 ml. pyridine were heated 15 minutes at 110–12° and cooled. The mixture was poured into 500 ml. ice water and filtered. The solid was dissolved in 350 ml. alcohol, 150 ml. water was added and the product allowed to crystallize.

EXAMPLE 7

Preparation of 2-amino-4-chloro-5-sulfamyl-N-(2'-methyl-4'-methoxyphenyl)-benzamide 7-chloro-6-sulfamylisatoic anhydride (27.7 gm.), 41 gm. 4-methoxy-2-methylaniline, and 100 ml. pyridine were refluxed 10 minutes, cooled to 40° and poured into a mixture of ice and concentrated HCl. The solid was filtered and washed with water, 5% NH₄OH, water, isopropanol, and ether. The solid was dried, dissolved in 50 ml. dimethylformamide, and 32 ml. water added. The product was filtered, washed with 3:2 dimethylformamide:water, then with isopropanol and ether to give 17.6 gm., M.P. 229–30°.

EXAMPLE 9

Preparation of 2-amino-4-chloro-5-sulfamyl-N-(p-sulfamylphenyl)-benzamide 7-chloro-6-sulfamylisatoic anhydride (5 gm.) was added over 5 minutes to 30 gm. p-aminobenzenesulfonamide which had been previously melted at 180°. When the reaction mixture became clear it was poured into 3 liters of water at 90°, treated with SO₂ gas and cooled. The solid was filtered, washed and dried and purified by chromatography to give a product M.P. 307–8° dec.

EXAMPLE 10

Preparation of 2-benzylamino-4-chloro-5-sulfamyl-N-(o-tolyl)-benzamide

Synthetic Route:

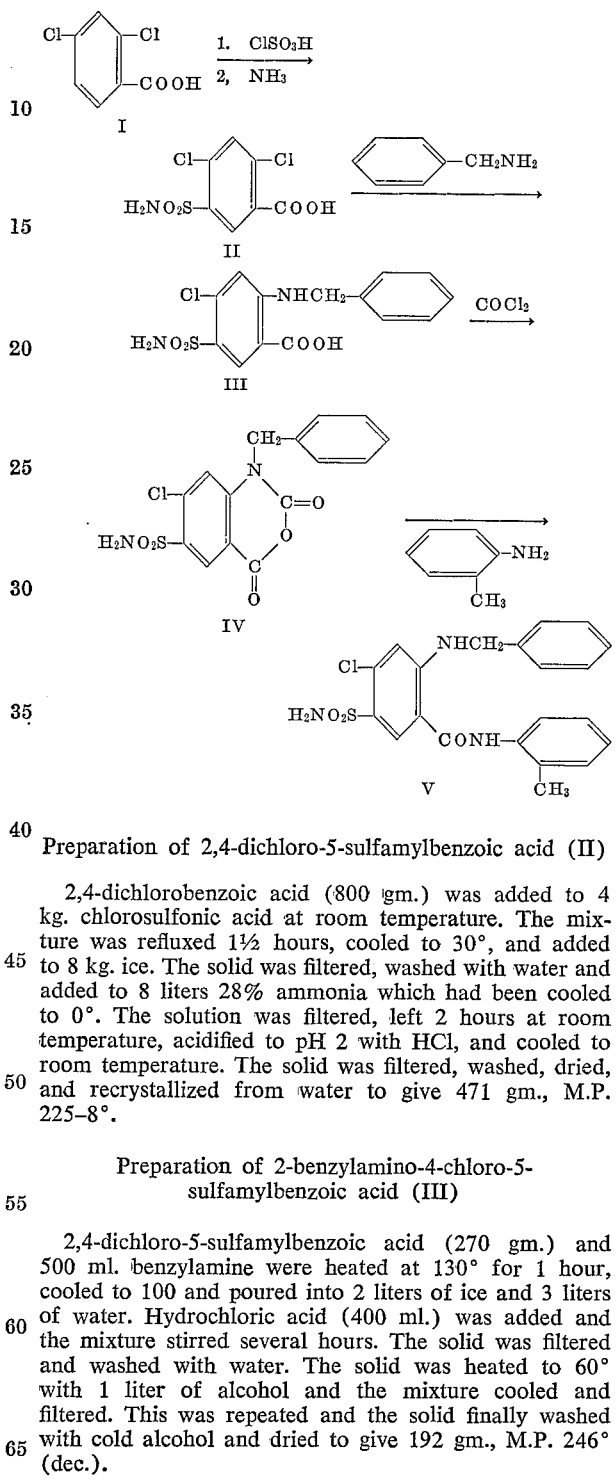

Preparation of 2,4-dichloro-5-sulfamylbenzoic acid (II)

2,4-dichlorobenzoic acid (800 gm.) was added to 4 kg. chlorosulfonic acid at room temperature. The mixture was refluxed 1½ hours, cooled to 30°, and added to 8 kg. ice. The solid was filtered, washed with water and added to 8 liters 28% ammonia which had been cooled to 0°. The solution was filtered, left 2 hours at room temperature, acidified to pH 2 with HCl, and cooled to room temperature. The solid was filtered, washed, dried, and recrystallized from water to give 471 gm., M.P. 225–8°.

Preparation of 2-benzylamino-4-chloro-5-sulfamylbenzoic acid (III)

2,4-dichloro-5-sulfamylbenzoic acid (270 gm.) and 500 ml. benzylamine were heated at 130° for 1 hour, cooled to 100 and poured into 2 liters of ice and 3 liters of water. Hydrochloric acid (400 ml.) was added and the mixture stirred several hours. The solid was filtered and washed with water. The solid was heated to 60° with 1 liter of alcohol and the mixture cooled and filtered. This was repeated and the solid finally washed with cold alcohol and dried to give 192 gm., M.P. 246° (dec.).

Preparation of 4-benzyl-6-chloro-7-sulfamylisatoic anhydride (IV)

2-benzylamino-4-chloro-5-sulfamylbenzoic acid (35 gm.) was added to 400 ml. glacial acetic acid. Phosgene (15 gm.) was added and the reaction mixture stirred overnight. The solid was filtered, washed with 500 ml. ether, and dried to give 26 gm., M.P. 230–2°.

Preparation of 2-benzylamino-4-chloro-5-sulfamyl-N-(o-tolyl)-benzamide (V)

4-benzyl-6-chloro-7-sulfamylisatoic anhydride (26 gm.) and 60 ml. o-toluidine were heated 5 minutes at 180° and cooled to 40°. Ether (200 ml.) was added and the solid filtered and washed to give 15 gm., M.P. 210–12°.

EXAMPLE 11

Preparation of 2-amino-4-chloro-5-sulfamyl-N-(o-ethylphenyl)-benzamide 7-chloro-6-sulfamylisatoic anhydride (10 gm.) and 60 o-ethylaniline were heated to 140°, kept at 140° for 5 minutes and cooled to 30°. Ether (60 ml.) was added and the solid was filtered and washed with ether. The crude product was dissolved in 15 ml. dimethylformamide, the solution heated to 90° and 15 ml. water added. The solid was filtered, washed with 50% aqueous dimethylformamide, then with methanol and ether. The product was refluxed with 50 ml. methanol and filtered hot to give 4 gm., M.P. 260–3° (methanol insoluble).

EXAMPLE 12

Preparation of 2-amino-4-chloro-5-sulfamyl-N-(2′-methyl-4′-hydroxyphenyl)-benzamide 7-chloro-6-sulfamylisatoic anhydride (39.2 gm.), 43 gm. 4-amino-3-methylphenol, and 140 ml. pyridine were refluxed 10 minutes, cooled to 40° and added to 800 ml. concentrated HCl and 1500 ml. ice. The solid was filtered and washed with water. After 24 hours the filtrate was refiltered to give a second crop. The solids were slurried with isopropanol and filtered to give 15 gm. and 21.2 gm. (second crop) product. Recrystallization of the second crop from 80 ml. ethylene glycol gave 15 gm., M.P. 298–9°.

EXAMPLE 13

Preparation of 4-chloro-2-(β-dimethylaminoethylamino)-5-sulfamyl-N-(o-tolyl)-benzamide Synthetic Route:

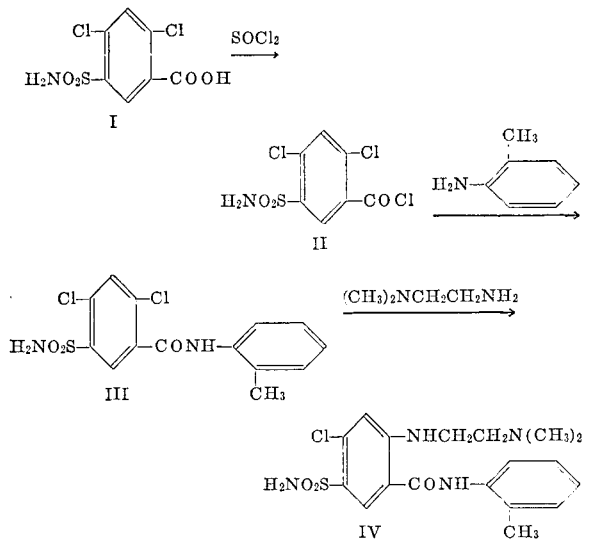

Preparation of 2,4-dichloro-5-sulfamylbenzyl chloride (II)

2,4-dichloro-5-sulfamylbenzoic acid (8 gm.) and 30 ml. thionyl chloride were refluxed 6 hours and taken to dryness on the rotovap to give a solid M.P. 145–8°.

Preparation of 2,4-dichloro-5-sulfamyl-N-(o-tolyl)-benzamide (III)

The product from II was added to 20 ml. o-toluidine with cooling. The resultant solid was filtered and washed with ether to give 8.5 gm. crude product M.P. 238–40° which was recrystallized from 95% ethanol.

Preparation of 4-chloro-2-(β-dimethylaminoethylamino)-5-sulfamyl-N-(o-tolyl)-benzamide (IV)

2,4-dichloro-5-sulfamyl-N-(o-tolyl) - benzamide (2.5 gm.) was refluxed with 10 ml. β-dimethylaminoethylamine for 1½ hours and added to 600 ml. water. The solid was filtered, washed and dried to give 2.3 gm., M.P. 80–5°.

EXAMPLE 14

Preparation of 4-chloro-2-(β-hydroxyethylamino)-5-sulfamyl-N-(o-tolyl)-benzamide 2,4-dichloro-5-sulfamyl - N - (o-tolyl)-benzamide (12 gm.) and 50 ml. 2-aminoethanol were stirred 10 minutes at room temperature and 10 minutes at 80°, then poured into 500 ml. water and acidified. The solid was filtered and recrystallized from 200 ml. 50% ethanol to give 4.2 gm., M.P. about 160°.

EXAMPLE 15

Preparation of 2-benzylamino-4-chloro-5-dimethylsulfamyl-N-(o-tolyl)-benzamide

Synthetic Route:

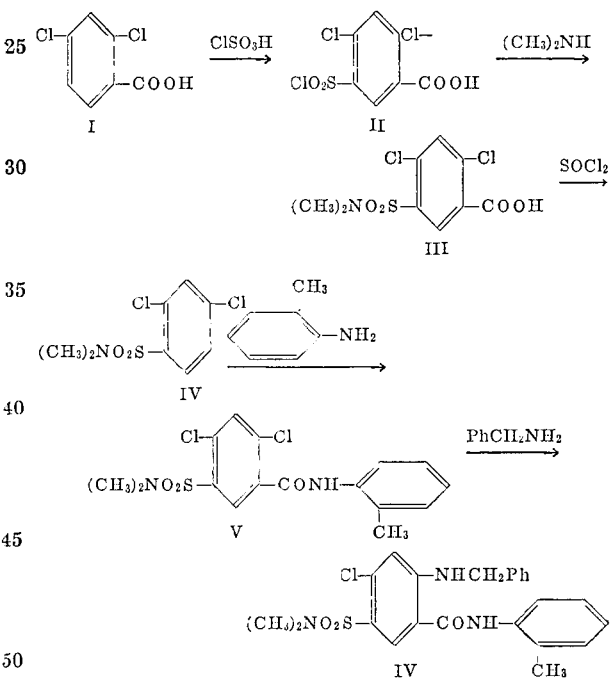

Preparation of 5-carboxy-2,4-dichloro-benzenesulfonyl chloride (II)

2,4-dichlorobenzoic acid (200 gm.) was added over 10 minutes to 1 kg. chlorosulfonic acid, the mixture stirred 4 hours at 160° and added to a mixture of ice and water. The solid was filtered, washed and sucked as dry as possible. The wet product was used in the next step.

Preparation of 2,4-dichloro-5-dimethylsulfamyl-benzoic acid (III)

About 112 gm. of 5-carboxy-2,4-dichloro-benzenesulfonylchloride was stirred 4 hours with 800 ml. water and 100 gm. dimethylamine. The solid was filtered and recrystallized from water (16 liters) to give 91 gm., M.P. 177–9°.

Preparation of 2,4-dichloro-5-dimethylsulfamyl-benzoyl chloride (IV)

2,4-dichloro-5-dimethylsulfamyl-benzoic acid (70 gm.) was refluxed 4½ hours with 100 ml. thionyl chloride and the mixture concentrated to dryness at 40° under vacuum to give 75 gm. solid, M.P. about 80°.

Preparation of 2,4-dichloro-5-dimethylsulfamyl-N-(o-tolyl)-benzamide (V)

2,4-dichloro - 5 - dimethylsulfamyl-benzoyl chloride (about 70 gm.) was added in portions to 500 ml. o-toluidine. The mixture was stirred ½ hour, heated to 120° and poured into 2 liters of ice water. The solution was acidified with HCl and filtered. The solid was washed with water, isopropanol, and isopropyl ether to give 63.5 gm., M.P. 182–3°.

Preparation of 2-benzylamino-4-chloro-5-dimethylsulfamyl-N-(o-tolyl)-benzamide (VI)

2,4-dichloro-5-dimethylsulfamyl - N - (o-tolyl)-benzamide (25 gm.) was heated 4 hours at 120° with 100 gm. benzylamine. The mixture was added to 400 ml. water, acidified and filtered. The solid was recrystallized from 200 ml. alcohol to give 10 gm., M.P. 233–5°.

EXAMPLE 16

Preparation of 2-benzylamino-4-chloro-5-dibenzylsulfamyl-N-(o-tolyl)-benzamide

Synthetic Route:

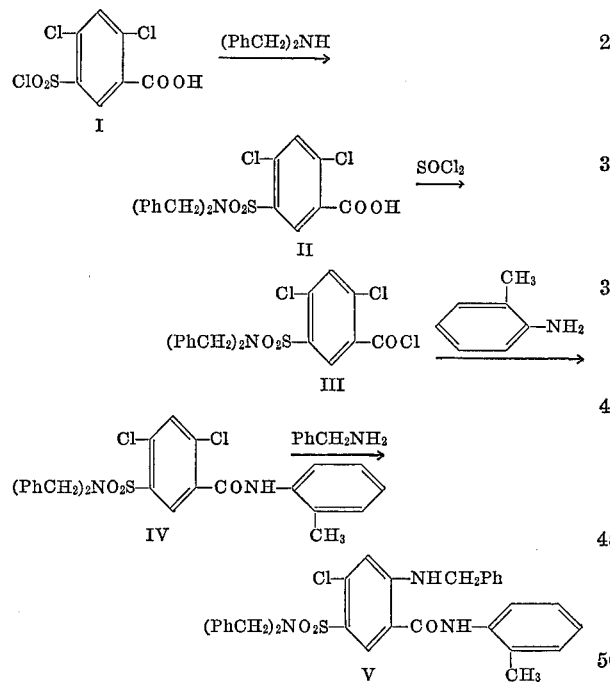

Preparation of 5-dibenzylsulfamyl-2,4-dichlorobenzoic acid (II)

5-dibenzylsulfamyl-2,4-dichlorobenzoic acid (25 gm.) 80 gm.) was added to a suspension of 100 gm. dibenzylamine in 500 ml. water and the mixture stirred 10 minutes and then heated 1 hour at 80°. The solid was filtered and recrystallized from 50% aqueous methanol.

Preparation of 5-dibenzylsulfamyl-2,4-dichlorobenzoyl chloride (III)

5 - carboxy-2,4-dichlorobenzenesulfonylchloride (about and 100 gm. thionyl chloride were refluxed 2 hours and concentrated to dryness. The residue was used in the next step without further purification.

Preparation of 5-dibenzylsulfamyl-2,4-dichloro-N-(o-tolyl)-benzamide (IV)

5-dibenzylsulfamyl-2,4-dichlorobenzoyl chloride (about 20 gm.) was heated to 100° for 20 minutes with 300 ml. o-toluidine and poured into 1600 ml. 10% HCl. The solid was filtereed, added to 200 ml. 95% ethanol and left overnight. The solid was filtered and dried to give 10.2 gm., M.P. 185–6°.

Preparation of 2-benzylamino-4-chloro-5-dibenzylsulfamyl-N-(o-tolyl)-benzamide (V)

5-dibenzylsulfamyl-2,4 - dichloro-N-(o-tolyl)-benzamide (10 gm.) and 25 ml. benzylamine were heated 2 hours at 125° and poured into 500 ml. water to give an oil which solidified on standing. The solid was filtered, heated with 200 ml. 95% ethanol and allowed to stand. The solid was filtered and dried to give 7.1 gm., M.P. about 180°.

EXAMPLE 17

Preparation of 2-amino-4-chloro-5-sulfamyl-N-2,4,6-trimethylphenyl)-benzamide 7-chloro-6-sulfamylisatoic anhydride 23 gm. and 50 gm. 2,4,6-trimethylaniline were heated at 200° for 3 minutes, 100 ml. acetic acid, then 400 ml. ether added. The solid was filtered and recrystallized from a mixture of 90 ml. dimethylformamide and 75 ml. water.

EXAMPLE 18

Preparation of 2-benzylamino-4-chloro-5-methylsulfamyl-N-(o-tolyl)-benzamide

Synthetic Route:

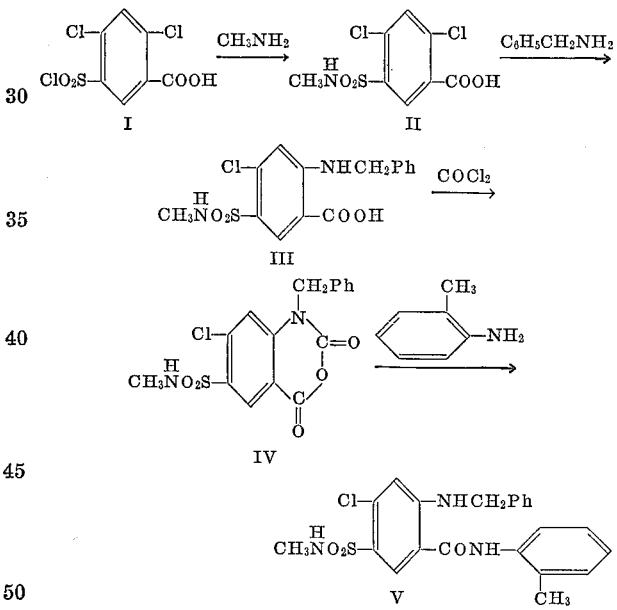

Preparation of 2,4-dichloro-5-methylsulfamyl benzoic acid (II)

5-carboxy - 2,4 - dichlorobenzenesulfonyl chloride, prepared from 200 gm. 2,4-dichlorobenzoic acid, was added to 2 liters 40% aqueous methylamine and stirred 3 hours. The solid was filtered off and the filtrate acidified to give 340 gm. product.

Preparation of 2-benzylamino-4-chloro-5-methylsulfamyl benzoic acid (III)

2,4-dichloro-5-methylsulfamylbenzoic acid (50 gm.) and 130 ml. benzylamine were heated 1 hour at 150°, 1 hour at 130°, and 1 hour at 90°. Water (400 ml.) was added and the mixture acidified to pH 3–5. The solid was filtered, heated with 400 ml. 95% ethanol and the mixture cooled and filtered to give 32 gm. product.

Preparation of 1-benzyl-1-chloro-6-methylsulfamylisatoic anhydride (IV)

2-benzylamino-4-chloro-5 - methylsulfamylbenzoic acid (44 gm.) was stirred overnight with 460 ml. acetic acid and 25 ml. phosgene. The solid was filtered and washed with isopropanol and ether to give 38 gm., M.P. 234–6°.

Preparation of 2-benzylamino-4-chloro-5-methylsulfamyl-N-(o-tolyl)-benzamide (V)

1-benzyl-7-chloro-6-methylsulfamylisatoic anhydride (38 gm.) and 200 ml. o-toluidine were heated to 170°, kept at 170–80° for 5 minutes, then cooled and added 800 ml. ether. After 2 days the solid was filtered to give 22 gm., M.P. 225–7°.

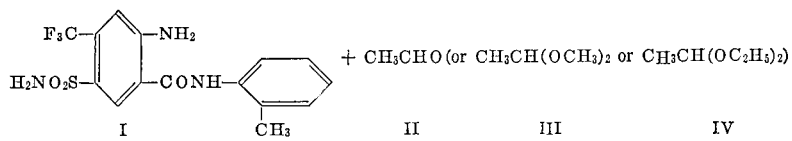

The following examples illustrate the use of the compounds of this invention for preparing diuretic quinazolinone compounds.

EXAMPLE 19

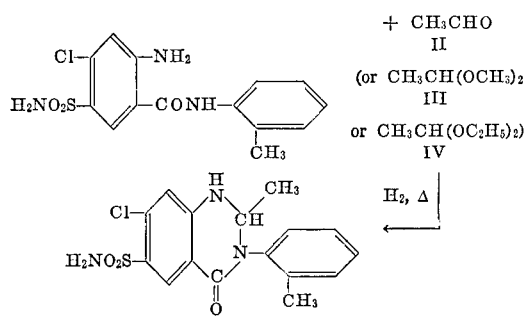

N-o-tolyl-4-chloro-5-sulphamyl-anthranilamide (I) is treated with an excess of acetaldehyde (II) or dimethoxyethane (III) or diethoxyethane (IV) and heated on a steam bath using a solvent (e.g. methanol, dimethylformamide, diglyme etc.), under acid condition for a few hours. The reaction mixture is concentrated under vacuo and the product, 2-methyl-3-(o-tolyl)-6-sulphamyl-7-chloro-1,2,3,4-tetrahydro-4-quinazolinone (720-22), is purified.

EXAMPLE 20

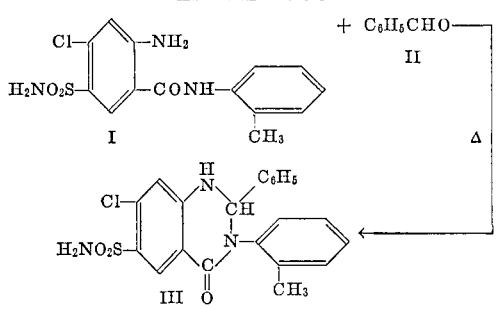

N-o-tolyl-4-chloro-5-sulphamyl-anthranilamide (I) is treated with benzaldehyde (II) and heated on a steam bath using a solvent (e.g. methanol, dimethylformamide, diglyme etc.) under acid or neutral condition for a few hours. The reaction mixture is concentrated in vacuo and the product, 2-phenyl-3-(o-tolyl)-6-sulphamyl-7-chloro-1,2,3,4-tetrahydro-4-quinazolinone (III), is purified.

EXAMPLE 21

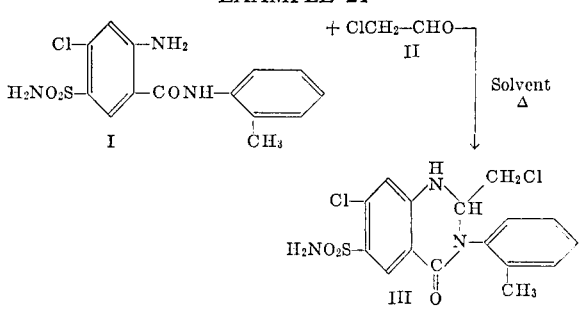

N-o-tolyl-4-chloro-5-sulphamyl-anthranilamide (I) is treated with chloro-acetaldehyde (II) and heated on a steam bath using a solvent, for a few hours. The reaction mixture is concentrated in vacuo and the product, 2-chloro-methyl-3-(o-tolyl)-6-sulphamyl-7-chloro-1,2,3,4-tetrahydro-4-quinazolinone (III), is purified.

EXAMPLE 22

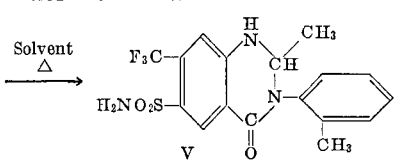

N-o-tolyl-4-trifluoromethyl-5-sulphamyl-anthranilamide (I) is treated with acetaldehyde (II) or dimethoxyethane (III) or diethoxyethane (IV) and heated on a steam bath using a solvent (e.g. methanol, dimethylformamide, diglyme etc., under acid condition for a few hours. The reaction mixture is concentrated in vacuo and the product, 2-methyl-3-(o-tolyl)-6-sulphamyl-7-trifluoromethyl-1,2,3,4-tetrahydro-4-quinazolinone (V), is purified.

Similarly, other diuretic, quinazolinone compounds may be prepared from the intermediate anthranilamide compounds of the invention.

I claim:

1. A compound selected from the group consisting of compounds having the formula:

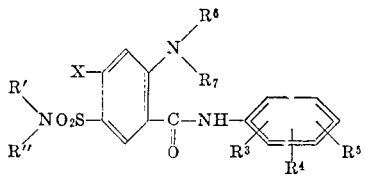

and the pharmaceutically acceptable salts thereof, wherein X is halogen or trifluoromethyl; $R'$ and $R''$ are hydrogen, lower alkyl, phenyllower alkyl or phenyl; $R^6$ and $R^7$ are hydrogen, lower alkyl, phenyl, phenyl lower alkyl, amino lower alkyl, lower alkyl amino lower alkyl, lower alkanoyl or hydroxy lower alkyl, and $R^3$, $R^4$ and $R^5$ are hydrogen, lower alkyl, hydroxy, lower alkoxy, amino, lower alkoxy lower alkyl, halogen, sulfamyl or trifluoromethyl.

2. A compound of claim 1 in base form.

3. A compound of claim 1 in which the compound is 2-amino-4-chloro-5-sulfamyl-N-(o-tolyl)-benzamide.

4. A compound of claim 1 in which the compound is 2-acetamido-4-chloro-5-sulfamyl-N-(o-tolyl)-benzamide.

5. A compound of claim 1 in which the compound is 2-amino-4-chloro-5-sulfamyl-N-phenylbenzamide.

6. A compound of claim 1 in which the compound is 2-amino-4-chloro-5-sulfamyl-N-(p-tolyl)-benzamide.

7. A compound of claim 1 in which the compound is 2-amino-4-chloro-5-sulfamyl-N-(m-tolyl)-benzamide.

8. A compound of claim 1 in which the compound is 2-amino-4-chloro-5-sulfamyl-N-(p-chlorophenyl)-benzamide.

9. A compound of claim 1 in which the compound is 2-amino-4-chloro-5-sulfamyl-N-(2'-methyl-4'-methoxyphenyl)-benzamide.

10. A compound of claim 1 in which the compound is 2-amino-4-chloro-5-sulfamyl-N-(p-sulfamylphenyl)-benzamide.

11. A compound of claim 1 in which the compound is 2-benzylamino-4-chloro-5-sulfamyl-N-(o-tolyl)-benzamide.

12. A compound of claim 1 in which the compound is 2-amino-4-chloro-5-sulfamyl-N-(o-ethylphenyl)-benzamide.

13

13. A compound of claim 1 in which the compound is 2 - amino - 4 - chloro-5-sulfamyl-N-(2'-methyl-4'-hydroxyphenyl)-benzamide.

14. A compound of claim 1 in which the compound is 4 - chloro - 2 - (β-dimethylaminoethylamino)-5-sulfamyl-N-(o-tolyl)-benzamide.

15. A compound of claim 1 in which the compound is 4 - chloro - 2 - (β-hydroxyethylamino)-5-sulfamyl-N-(o-tolyl)-benzamide.

16. A compound of claim 1 in which the compound is 2 - benzylamino - 4 - chloro-5-dimethylsulfamyl-N-(o-tolyl)-benzamide.

17. A compound of claim 1 in which the compound is 2 - benzylamino - 4 - chloro-5-dibenzylsulfamyl-N-(o-tolyl)-benzamide.

18. A compound of claim 1 in which the compound is 2 - amino - 4 - chloro-5-sulfamyl-N-(2,4,6-trimethylphenyl)-benzamide.

19. A compound of claim 1 in which the compound is 2 - benzylamino - 4 - chloro-5-methylsulfamyl-N-(o-tolyl)-benzamide.

14

References Cited

UNITED STATES PATENTS

| 2,910,488 | 10/1959 | Novello | 260—397.7 |
| 3,014,906 | 12/1961 | Gadekar et al. | 260—397.7 |

FOREIGN PATENTS

| 15,208 | 1899 | Great Britain | 260—244A |
| 16,891 | 9/1963 | Japan | 260—244A |

OTHER REFERENCES

Chemical Abstracts, vol. 65, 8906e, 1966, Desai et al.

HENRY R. JILES, Primary Examiner

S. D. WINTERS, Assistant Examiner

U.S. Cl. X.R.

260—578, 562, 244, 515, 544, 556, 256.5